United States Patent
Azeem

(10) Patent No.: US 12,178,682 B2
(45) Date of Patent: Dec. 31, 2024

(54) DENTAL BITE BLOCK FOR FINAL IMPRESSION AND BITE REGISTRATION

(71) Applicant: Salman Azeem, Lincolnwood, IL (US)

(72) Inventor: Salman Azeem, Lincolnwood, IL (US)

( * ) Notice: Subject to any disclaimer, the term of this patent is extended or adjusted under 35 U.S.C. 154(b) by 0 days.

(21) Appl. No.: 18/320,637

(22) Filed: May 19, 2023

(65) Prior Publication Data
US 2023/0285123 A1    Sep. 14, 2023

Related U.S. Application Data

(63) Continuation of application No. 18/174,396, filed on Feb. 24, 2023, now abandoned, which is a continuation-in-part of application No. PCT/US2022/016858, filed on Feb. 17, 2022.

(60) Provisional application No. 63/150,478, filed on Feb. 17, 2021.

(51) Int. Cl.
*A61C 9/00* (2006.01)

(52) U.S. Cl.
CPC ................. *A61C 9/0006* (2013.01)

(58) Field of Classification Search
CPC .............. A61C 9/0006; A61C 19/05
See application file for complete search history.

(56) References Cited

U.S. PATENT DOCUMENTS

| | | | |
|---|---|---|---|
| 1,955,709 A * | 4/1934 | Kinsley | A61C 13/06 433/48 |
| 2,577,513 A * | 12/1951 | Cunningham | A61C 9/0006 433/46 |
| 2,756,503 A * | 7/1956 | Feminella | A61C 11/02 433/71 |
| 2,963,786 A * | 12/1960 | Browning | A61C 9/0006 433/37 |
| 3,399,457 A | 9/1968 | Hagman | |
| 4,227,877 A | 10/1980 | Tureaud et al. | |
| 4,245,988 A * | 1/1981 | Cinotti | A61C 9/00 433/68 |
| 4,375,965 A | 3/1983 | Weissman | |
| 5,011,407 A | 4/1991 | Pelerin | |
| 5,040,976 A | 8/1991 | Ubel, III | |
| 5,112,225 A | 5/1992 | Diesso | |
| 5,562,449 A | 10/1996 | Jacobs | |
| 5,961,325 A * | 10/1999 | Van Handel | A61C 9/0006 433/213 |
| 6,149,427 A * | 11/2000 | Van Handel | A61C 9/0006 433/44 |
| 6,196,840 B1 * | 3/2001 | Zentz | A61K 6/90 433/48 |

(Continued)

OTHER PUBLICATIONS

Dentorium, "Denorium Bite Blocks," web page <http://www.dentorium.com/catalogue?prodgroupid=117> retrieved Jun. 27, 2017.

*Primary Examiner* — Heidi M Eide

(57) ABSTRACT

A dental bite block for final impression and bite registration includes at least one dental impression tray, a plurality of spikes, and at least one wax rim. The plurality of spikes is connected onto the at least one dental impression tray, and the plurality of spikes is oriented away from the at least one dental impression tray. Resultantly, the plurality of spikes is able to traverse into the at least one wax rim thus mounting the at least one wax rim onto the at least one dental impression tray.

5 Claims, 6 Drawing Sheets

(56) References Cited

U.S. PATENT DOCUMENTS

| | | | | |
|---|---|---|---|---|
| 6,447,292 B1 * | 9/2002 | Champagne | ......... | A61C 9/0006 433/45 |
| 2003/0180681 A1 * | 9/2003 | Kwon | .................. | A61C 9/0006 433/45 |
| 2015/0118640 A1 | 4/2015 | Schmitt | | |
| 2016/0106525 A1 | 4/2016 | Cha et al. | | |

* cited by examiner

DENTAL BITE BLOCK FOR FINAL IMPRESSION AND BITE REGISTRATION

The current application is a continuation application of the U.S. non-provisional application Ser. No. 18/174,396 filed on Feb. 24, 2023. The U.S. non-provisional application Ser. No. 18/174,396 is a continuation-in-part (CIP) application of the Patent Cooperation Treaty (PCT) application PCT/US2022/016858 filed on Feb. 17, 2022. The PCT application PCT/US2022/016858 claims a priority to the U.S. provisional application Ser. No. 63/150,478 filed on Feb. 17, 2021.

FIELD OF THE INVENTION

The present invention relates generally to an apparatus for creating dentures. More specifically, the present invention provides an apparatus that takes the final impression and bite registration with a single office visit.

BACKGROUND OF THE INVENTION

For many years, companies and individuals have been trying to create a way to get the dentures done quicker and to reduce the number of visits for the patients and the procedures for the dentists. Fabricating the complete dentures and partials dentures requires multiple steps from the dentist and dental labs. The first procedure is to take an initial impression in a tray. The tray gives an overall shape of the patient's ridges. However, the trays used for the initial impressions are pre-made therefore, they are not custom to different patients. Because the initial trays used are not the best fit, the dentist requests the dental lab to make a customized second tray for a final impression which is done on the poured-up stone models from the first impression taken. The dental lab fabricates the customized second tray and can take anywhere from a few days to a week. Once the customized second tray is made on the stone model, the dental lab sends the customized second tray to the dentist. The dentist then calls in the patient and takes a second and final impression as the second procedure. The final impression taken is sent to the dental lab so that the dental lab can fabricate what is called "bite blocks" or "wax-rims" for the recording the bite registrations.

For the bite registration to be the most successful, the dental lab usually makes a hard-base plate on the mold of the patient's arch and also the dental lab adheres a U-shaped wax onto the hard-base plate. Once the dental lab fabricates the bite blocks it is then sent to the dentist who calls in the patient again to record the bite registration. The dentist then inserts the bite blocks in the patient's mouth and records the bite registration as the third procedure. After making minor adjustments the dentist records the bite registration and sends it to the dental lab so that the dental lab knows where the bites of the patient are located. Depending on what is to be fabricated, the dentist can insert the bite block for upper, lower, or both. The point of bite blocks that are made by the dental lab is to capture where the patient's true bite is as there are no teeth in the case of making complete dentures or many teeth missing in the case for making partial dentures. The dental lab then fixes the position by using articulator so that the next step which is to add the teeth is started. While each procedure is fairly quick, it still requires multiple appointments.

An objective of the present invention is to provide dental bite block apparatus that can take both the final impression and the bite registration within a single office visit. The present invention reduces the number of visits of the patient to the dental office by completing the procedures of taking the final impression and the bite registration during the same visit. Using the present invention, the dental lab and the dentists do not have to start from scratch, but they have pre-made bite blocks that requires minor adjustments before use. Additional features and benefits are further discussed in the sections below.

DETAIL DESCRIPTIONS OF THE INVENTION

Figure 1:
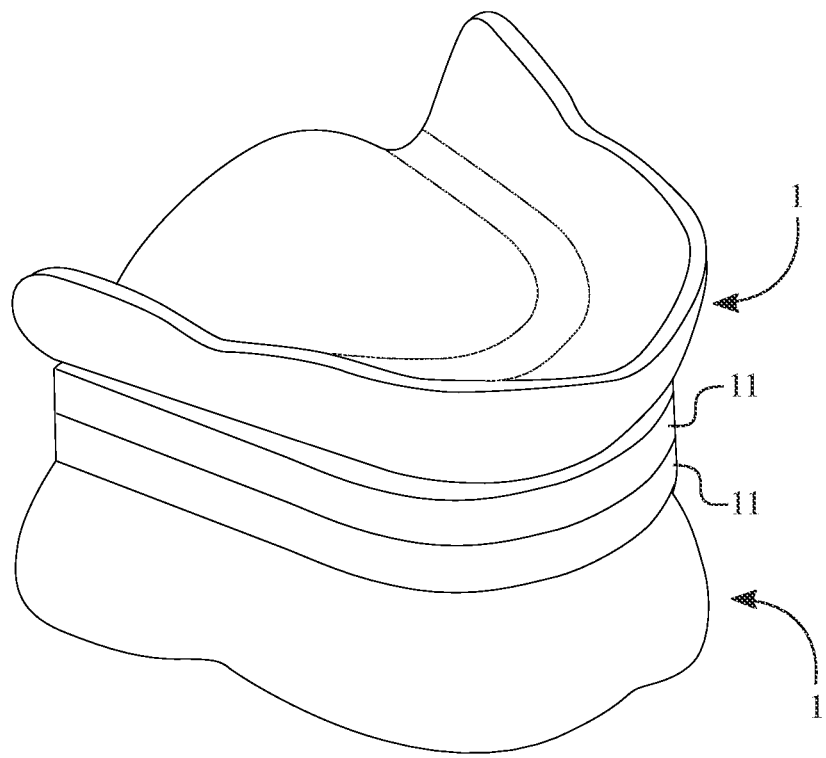
FIG. 1 is a top perspective view of the present invention without the plurality of connectors.
Figure 2:
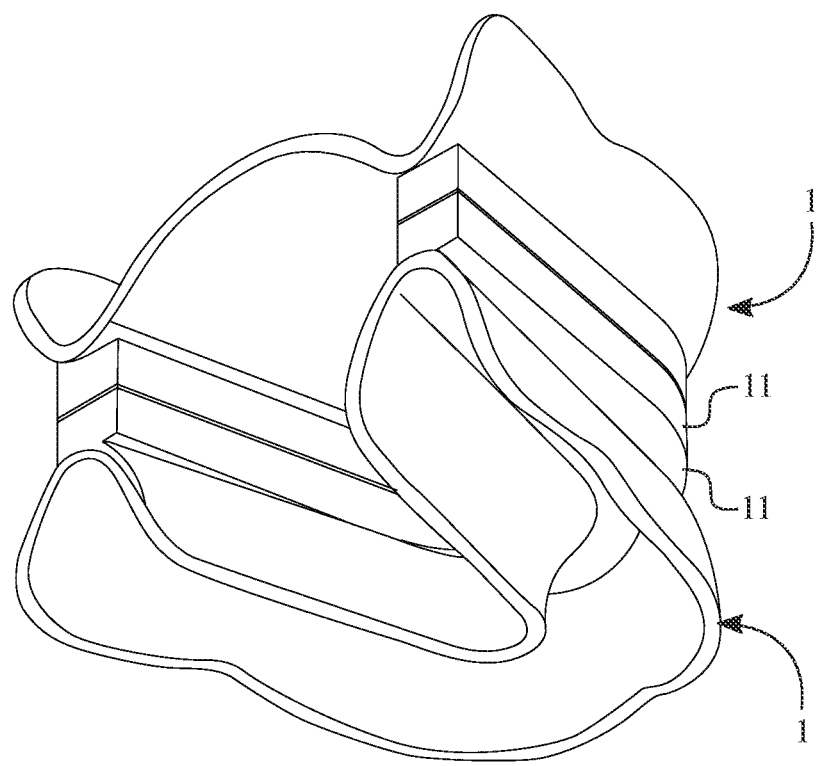
FIG. 2 is a bottom perspective view of the present invention without the plurality of connectors.

All illustrations of the drawings are for the purpose of describing selected versions of the present invention and are not intended to limit the scope of the present invention.

The present invention provides a dental bite block for final impression and bite registration. The present invention allows dentists to take a patient's final impression and bite registration at the same time. Rather than working on dental models, the dentists would directly work in the mouth of the patient. The initial procedure of fabricating the dentures or the partial dentures is to take an initial impression. Taking the initial impression occurs prior to the visit for the final impression and the bite registration. Typically, the patient would have to visit the dental office separately for the final impression and the bite registration. However, the present invention reduces the manufacturing and processing time by having the two procedures done in a single visit to the dental office. Optionally, the initial procedure, taking the initial impression, may be completed in the same visit as well.

As can be seen in FIGS. 1-4, the present invention comprises at least one dental impression tray 1, a plurality of spikes 10, and at least one wax rim 11. In reference to general configuration of the present invention, the at least one dental impression tray 1 functions as the base structure and fits within the patient's to make the final impression for the upper arch and/or the lower arch. The plurality of spikes 10 is connected onto the at least one dental impression tray 1 and oriented away from the at least one dental impression tray 1. As a result, the plurality of spikes 10 oriented towards the patient's tongue. The at least one wax rim 11 is mounted to the at least one dental impression tray 1 by the plurality of spikes 10 as the plurality of spikes 10 traverses into the at least one wax rim 11. The at least one wax rim 11 is formed into a U-shaped and allows the dentists to finalize the bite registration thus enabling the next steps of the denture fabricating process. Due to the integration of the plurality of spikes 10, the dentists are able to combine the final impression and bite registration into a single office visit that is generally completed with two separate office visits.

In order to optimize the results of the final impression, the at least one dental impression tray 1 is made of moldable thermoplastic material. More specifically, the dentists insert a heated dental impression tray into the patient's mouth and captures the final impression. The dental impression tray is then able to solidify when the dental impression tray is exposed to room temperature. The dental impression tray can also be dipped into cool water to further solidify.

The at least one dental impression tray 1 generally configured into a small, medium, and large sizes so that the dentists are able to select the most accurate size for each of the patients. The at least one dental impression tray 1 comes in the shape of complete top and bottom dentures. For the partial dentures, the dentist would have to remove portions of the at least one dental impression tray 1 and the at least one wax rim 11 where the patient's natural teeth are located. Preferably, the at least one dental impression tray 1 is cut off using a lathe motor and the at least one wax rim 11 is cut off using a knife.

Figure 3:
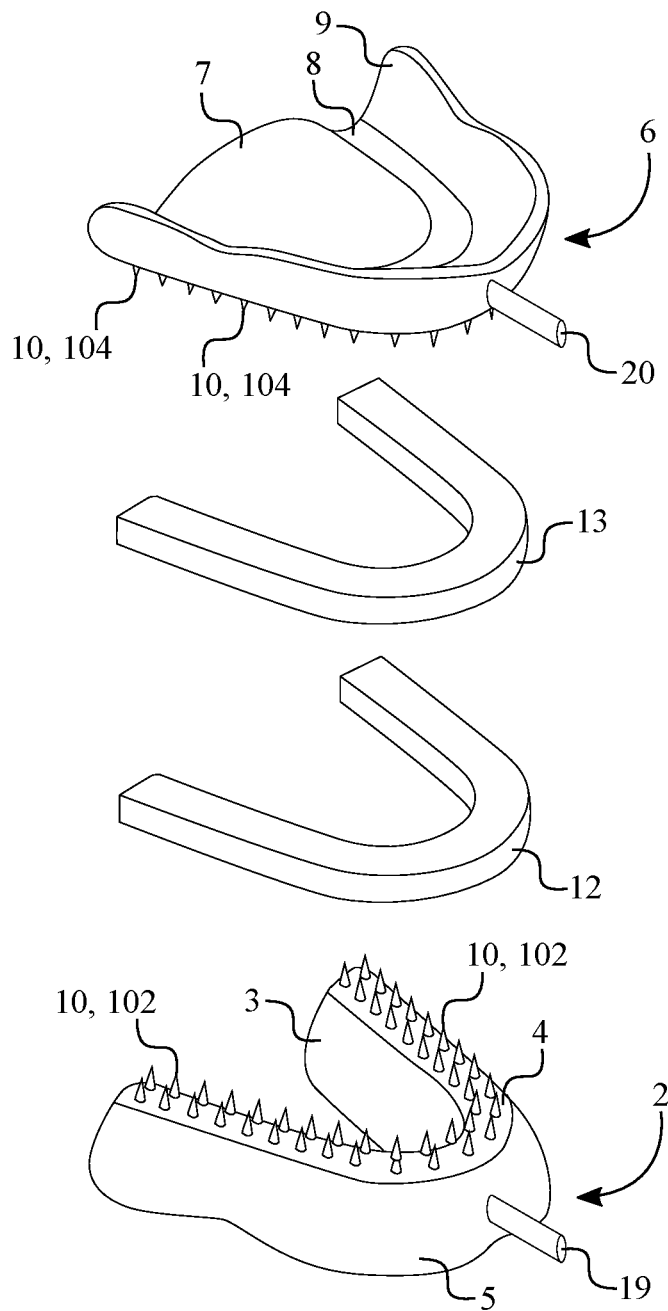
FIG. 3 is a top-exploded perspective view of the present invention without the plurality of connectors.
Figure 4:
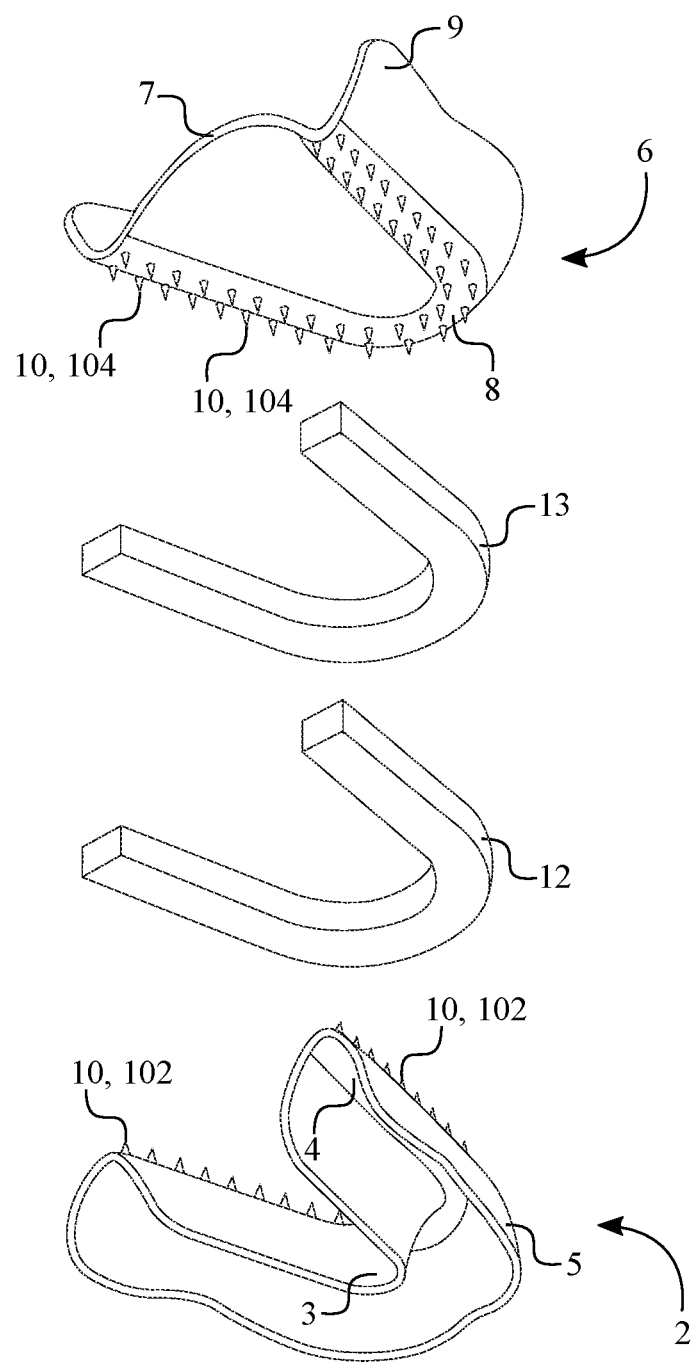
FIG. 4 is a bottom-exploded perspective view of the present invention without the plurality of connectors.

In reference to FIG. 3 and FIG. 4, the at least one dental impression tray 1 may comprise a mandibular impression tray 2 when a patient only requires the bottom denture. The at least one wax rim 11 may comprise a mandibular wax rim 12 so that the mandibular wax rim 12 can be mounted to the mandibular impression tray 2 by the plurality of spikes 10. Due to the anatomy of the mouth, the mandibular impression tray 2 may comprise a lingual flange section 3, a lower floor section 4, and a lower labial flange section 5. More specifically, the lingual flange section 3 and the lower labial flange section 5 are oppositely positioned of each other about the lower floor section 4. The lingual flange section 3 is terminally connected to the lower floor section 4 and oriented away from the lower floor section 4. As a result, the lingual flange section 3 is able to externally position around the tongue and cover the interior muscle surface of the lower arch. The lower labial flange section 5 is terminally connected to the lower floor section 4 and oriented towards the lingual flange section 3. As a result, the lower labial flange section 5 is able to cover the exterior muscle surface of the lower arch. The plurality of spikes 10 is connected onto the lower floor section 4 and oriented away from the lingual flange section 3 and the lower labial flange section 5. In other words, the plurality of spikes 10 is oriented toward the upper arch so that the mandibular wax rim 12 can be attached to the mandibular impression tray 2.

Furthermore, the plurality of spikes 10 is thermally insulated by the mandibular wax rim 12 so that the structural integrity of the plurality of spikes 10 can be protected. More specifically, when the at least one dental impression tray 1 and the attached mandibular wax rim 12 are introduced into a hot water, the mandibular wax rim 12 is able to fully protect the plurality of spikes 10 from the hot water. As a result, the plurality of spikes 10 is able to maintain a perpendicular orientation to the lower floor section 4 and maintain its structural integrity thus protecting the intended shape of the plurality of spikes 10. Furthermore, the mandibular wax rim 12 can also function as a handle during the introduction to the hot water.

In reference to FIG. 3 and FIG. 4, the at least one dental impression tray 1 may comprise a maxillary impression tray 6 when a patient only requires the top denture. The at least one wax rim 11 may comprise a maxillary wax rim 13 so that the maxillary wax rim 13 can be mounted to the maxillary impression tray 6 by the plurality of spikes 10. Due to the anatomy of the mouth, the maxillary impression tray 6 may comprise a vault section 7, an upper floor section 8, and an upper labial flange section 9. More specifically, the vault section 7 and the upper labial flange section 9 are oppositely positioned of each other about the upper floor section 8. The vault section 7 is terminally connected to the upper floor section 8 and oriented away from the upper floor section 8. As a result, the vault section 7 is able to cover the palate portion of the patient's mouth. The upper labial flange section 9 is terminally connected to the upper floor section 8 and oriented towards the vault section 7. As a result, the upper labial flange section 9 is able to cover the exterior muscle surface of the upper arch. The plurality of spikes 10 is connected onto the upper floor section 8 and oriented away from the upper labial flange section 9. In other words, the plurality of spikes 10 is oriented toward the lower arch so that the maxillary wax rim 13 can be attached to the maxillary impression tray 6.

Furthermore, the plurality of spikes 10 is thermally insulated by the maxillary wax rim 13 so that the structural integrity of the plurality of spikes 10 can be protected. More specifically, when the at least one dental impression tray 1 and the attached maxillary wax rim 13 are introduced into a hot water, the maxillary wax rim 13 is able to fully protect the plurality of spikes 10 from the hot water. As a result, the plurality of spikes 10 is able to maintain a perpendicular orientation to the upper floor section 8 and maintain its structural integrity thus protecting the intended shape of the plurality of spikes 10. Furthermore, the maxillary wax rim 13 can also function as a handle during the introduction to the hot water.

Figure 5:
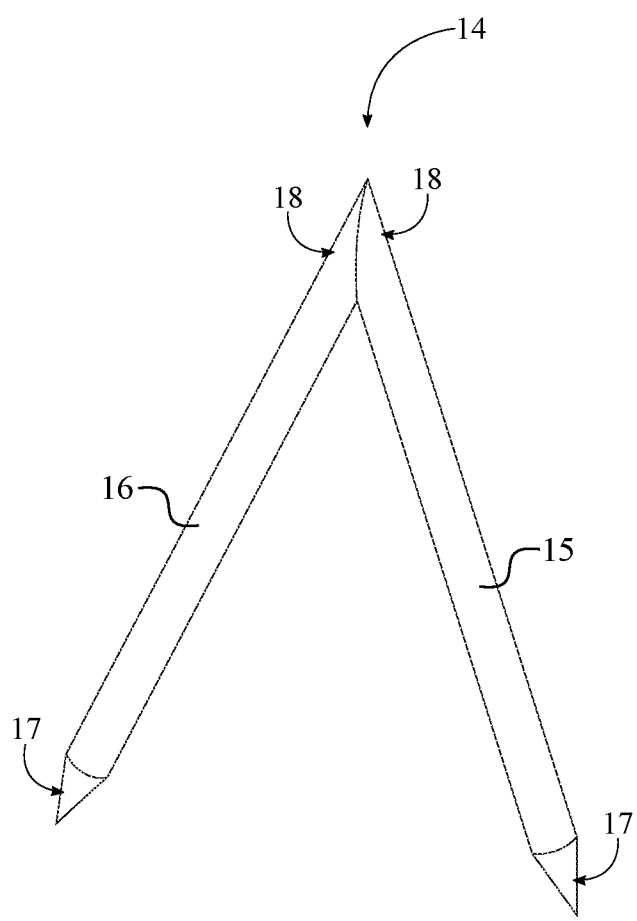
FIG. 5 is one of the plurality of connectors of the present invention.
Figure 6:
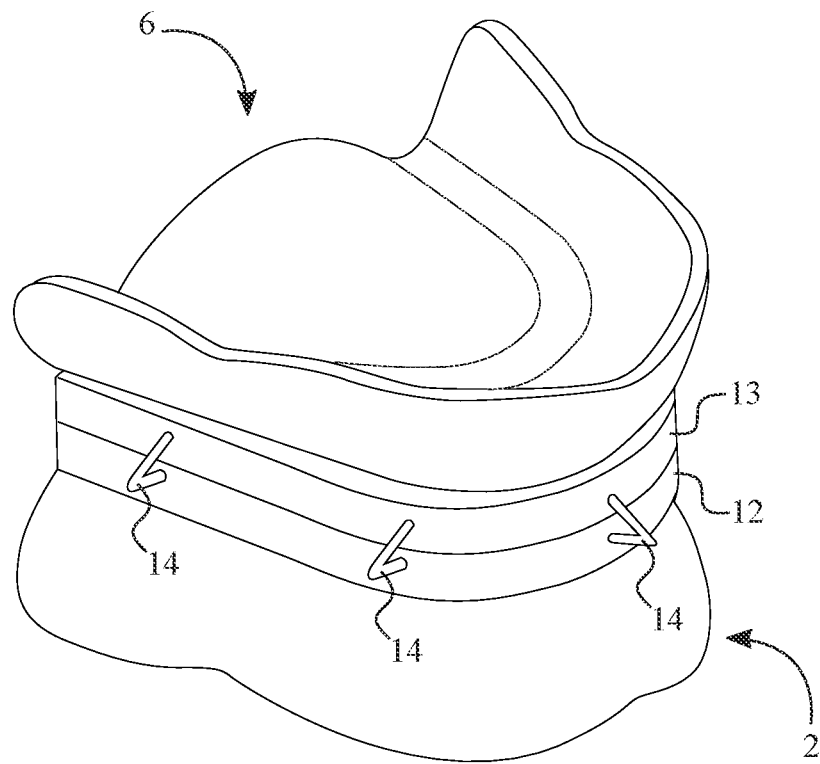
FIG. 6 is a top perspective view of the present invention with the plurality of connectors.

In reference to FIG. 5 and FIG. 6, the present invention may further comprise a plurality of connectors 14 when a patient requires both the top denture and the bottom denture. More specifically, the at least one dental impression tray 1 may comprise the mandibular impression tray 2 and the maxillary impression tray 6. The at least one wax rim 11 may comprise the mandibular wax rim 12 and the maxillary wax rim 13. The mandibular wax rim 12 is mounted to the mandibular impression tray 2 by the plurality of spikes 10. The maxillary wax rim 13 is mounted to the maxillary impression tray 6 by the plurality of spikes 10. As a result, the mandibular wax rim 12 and the maxillary wax rim 13 are attached to each other by the plurality of connectors 14. More specifically, the dentist would insert the one end of each connector into the mandibular wax rim 12 and the other end of the corresponding connector into the maxillary wax rim 13 to maintain the fixed position for the next procedure. Other materials such as wax, lab putty, or sticky wax can be utilized maintain a fixed position for the mandibular wax rim 12 and the maxillary wax rim 13.

While it is possible to adhere the mandibular wax rim 12 to the mandibular impression tray 2 and the maxillary wax rim 13 to the maxillary impression tray 6 using a glue or any other adhesives, it is not as stable as the utilization of the plurality of spikes 10. Since the patient's mouth has a limited space to work on, having a complete set would not produce accurate results of the final impression and the bite registration. For these reasons, working on both the final impression and the bite registration at the same time is not recommended.

In some embodiments of the present invention, the at least one dental impression tray 1 and the at least one wax rim 11 can be manufactured pre-molded to each other through the plurality of spikes 10. This embodiment is considered similar to the preferred embodiment of as the only different being the at least one wax rim 11 being connected to the at least one dental impression tray 1 rather than being attached.

In some embodiments of the present invention, the present invention can comprise a handle so that the dentists can utilize the handle to move the at least one dental impression tray 1. More specifically, the handle is connected and extended outward from the at least one dental impression tray 1 so that the dentists can use the handle to move around the at least one dental impression tray 1 during the procedure.

In traditional method of making dentures, some patients require a "fuller mouth" by making their dentures adjust about the lower labial and/or the upper labial. More specifically, a dentist inserts the wax teeth and examine the appearance of the patient's lips. Depending upon the patient's preference, the dentist instructs the lab technicians to add more wax on to the lower labial and/or the upper labial to move the lips forward or to remove wax from the lower labial and/or the upper labial to move the lips backward. However, the present invention simplifies the aforementioned process as the dentist can adjust the positioning the mandibular wax rim 12 and/or the maxillary wax rim 13 about the corresponding plurality of spikes 10. As a result, the mandibular wax rim 12 is positioned offset from the lower floor section 4, and the maxillary wax rim 13 is positioned offset from the upper floor section 8. For example, the dentist can easily move patient's lip forward by moving the mandibular wax rim 12 and/or the maxillary wax rim 13 forward as the corresponding plurality of spikes 10 provides sufficient attachment surface for the mandibular wax rim 12 and/or the maxillary wax rim 13. The dentist can easily move patient's lip backward by moving the mandibular wax rim 12 and/or the maxillary wax rim 13 forward as the corresponding plurality of spikes 10 provides sufficient attachment surface for the mandibular wax rim 12 and/or the maxillary wax rim 13.

Although the invention has been explained in relation to its preferred embodiment, it is to be understood that many other possible modifications and variations can be made without departing from the spirit and scope of the invention as hereinafter claimed.

What is claimed is:

1. A dental bite block for final impression and bite registration comprising:
   a mandibular impression tray;
   a maxillary impression tray;
   a plurality of mandibular spikes;
   a plurality of maxillary spikes;
   a mandibular wax rim;
   a maxillary wax rim;
   a plurality of connectors;
   each of the plurality of connectors comprising a mandibular connector prong and a maxillary connector prong;
   the mandibular connector prong and the maxillary connector prong each comprise a free end and a fixed end;
   the mandibular impression tray being made of a moldable thermoplastic material;
   each of the plurality of mandibular spikes being a conical-shaped rigid body;
   the plurality of mandibular spikes being distributed across a lower floor section of the mandibular impression tray;
   a pointed end for each of the plurality of mandibular spikes being positioned offset from the lower floor section;
   a base end for each of the plurality of mandibular spikes being connected onto the lower floor section;
   each of the plurality of mandibular spikes traversing into the mandibular wax rim;
   the mandibular wax rim being mounted to the mandibular impression tray by the plurality of mandibular spikes;
   the maxillary impression tray being made of a moldable thermoplastic material;
   each of the plurality of maxillary spikes being a conical-shaped rigid body;
   the plurality of maxillary spikes being distributed across an upper floor section of the maxillary impression tray;
   a pointed end for each of the plurality of maxillary spikes being positioned offset from the upper floor section;
   a base end for each of the plurality of maxillary spikes being connected onto the upper floor section;
   each of the plurality of maxillary spikes traversing into the maxillary wax rim;
   the maxillary wax rim being mounted to the maxillary impression tray by the plurality of maxillary spikes;
   the plurality of connectors being positioned about the mandibular wax rim and the maxillary wax rim;
   the mandibular wax rim and the maxillary wax rim being attached against each other by the plurality of connectors;
   the mandibular connector prong and the maxillary connector prong being positioned at an acute angle with each other;
   the fixed end of the mandibular connector prong and the fixed end of the maxillary connector prong being connected onto each other;
   the free end of the mandibular connector prong traversing into the mandibular wax rim; and
   the free end of the maxillary connector prong traversing into the maxillary wax rim.

2. The dental bite block for final impression and bite registration as claimed in claim 1 comprising:
   the mandibular impression tray further comprising a lingual flange section and a lower labial flange section;
   the lingual flange section and the lower labial flange section being oppositely positioned of each other across the lower floor section;
   the lingual flange section being terminally connected to the lower floor section;
   the lower labial flange section being terminally connected to the lower floor section; and
   the plurality of mandibular spikes being oriented away from the lingual flange section and the lower labial flange section.

3. The dental bite block for final impression and bite registration as claimed in claim 1, wherein the plurality of mandibular spikes is thermally insulated by the mandibular wax rim.

4. The dental bite block for final impression and bite registration as claimed in claim 1 comprising:
   the maxillary impression tray comprising a vault section and an upper labial flange section;
   the vault section and the upper labial flange section being oppositely positioned of each other across the upper floor section;
   the vault section being terminally connected to the upper floor section;
   the upper labial flange section being terminally connected to the upper floor section; and
   the plurality of maxillary spikes being oriented away from the upper labial flange section.

5. The dental bite block for final impression and bite registration as claimed in claim 1, wherein the plurality of maxillary spikes is thermally insulated by the maxillary wax rim.

* * * * *